United States Patent [19]

Zafred et al.

[11] Patent Number: 4,627,169
[45] Date of Patent: Dec. 9, 1986

[54] REMOTE CENTER COMPLIANCE DEVICE

[75] Inventors: Paolo R. Zafred, Pittsburgh; Luciano Veronesi, O'Hara Township, Allegheny County, both of Pa.

[73] Assignee: Westinghouse Electric Corp., Pittsburgh, Pa.

[21] Appl. No.: 822,727

[22] Filed: Jan. 27, 1986

[51] Int. Cl.⁴ .............................................. G01B 5/25
[52] U.S. Cl. .................... 33/169 C; 33/180 R; 33/185 R
[58] Field of Search ............ 33/169 C, 172 D, 180 R, 33/181 R, 185 R

[56] References Cited

U.S. PATENT DOCUMENTS

| | | | |
|---|---|---|---|
| 4,098,001 | 7/1978 | Watson | 33/169 |
| 4,155,169 | 5/1979 | Drake et al. | 33/169 |
| 4,283,153 | 8/1981 | Brendamour | 33/169 C |
| 4,355,469 | 10/1982 | Nevins et al. | 33/185 |
| 4,379,363 | 4/1983 | Whitney | 33/169 |
| 4,400,885 | 8/1983 | Consales | 33/185 |
| 4,414,750 | 11/1983 | De Fazio | 33/185 |
| 4,458,424 | 7/1984 | Cutkosky et al. | 33/185 |
| 4,477,975 | 10/1984 | De Fazio et al. | 33/169 |
| 4,485,562 | 12/1984 | De Fazio | 33/169 C |

*Primary Examiner*—Willis Little
*Attorney, Agent, or Firm*—L. A. DePaul

[57] ABSTRACT

A single stage remote center compliance device having a high degree translational and rotational compliance for use in connection with a manipulator device which includes first and second members spaced from each other and interconnected by a pair of crossed interconnected shafts and a plurality of tilted, axially compressible and laterally deformable compression coil springs.

11 Claims, 9 Drawing Figures

FIG. 1.
FIG. 2.
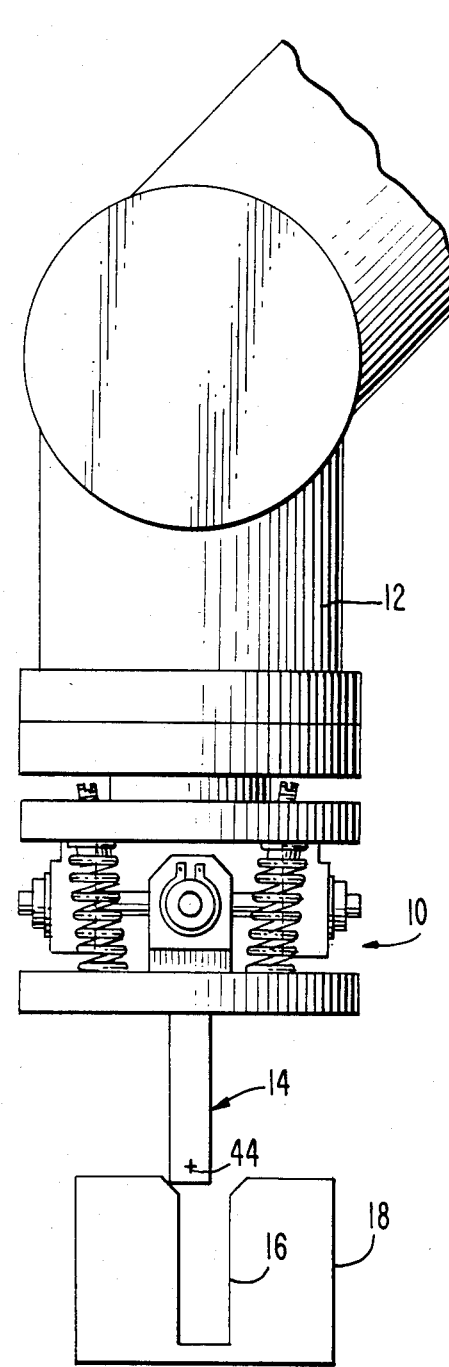
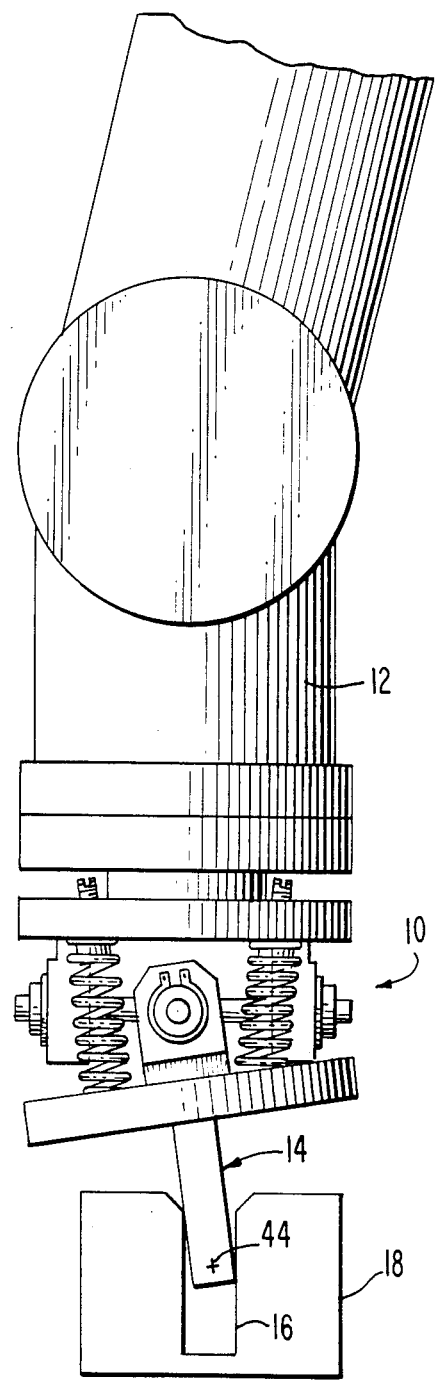

REMOTE CENTER COMPLIANCE DEVICE

BACKGROUND OF THE INVENTION

1. Field of the Invention

This invention relates to a remote center compliance device for an industrial manipulator and, more particularly, to a single stage remote center compliance device having a high degree of translational and rotational compliance.

2. Description of the Prior Art

In the design and construction of industrial manipulators, it is an objective to mimic limited aspects of various human capabilities in order to improve the positional accuracy of industrial manipulators in such tasks as inserting a peg in a hole, mating between two parts, a tool and a part, a part and a fixture and many other mating parts. When parts are of an exact nature and the tools and jigs holding them are precisely located, there are no errors in assembly. Not all surfaces on a part, however, are held to the same tolerance and often the mating surfaces are not in perfectly known positions. The design and construction of mechanical manipulators ultimately involves a compromise between manipulator speed, pay load capacity and positional accuracy in order to cope with the aforementioned problems.

It has been known to utilize remote center compliance (RCC) devices as an aid in overcoming the problems encountered in the use of industrial manipulators for insertion and mating operations. These known compliance devices address these difficulties by functioning as a multi-access float which accommodates positional and angular misalignments between parts. For example, U.S. Pat. No. 4,098,001 and U.S. Pat. No. 4,155,169 both disclose RCC devices employing two stages of movable or deformable elements to provide the necessary combination of independent translational and rotational compliant action. These devices hold a workpiece so that the workpiece can rotate about the point where it engages a mating part and lateral error and angular error are absorbed independently so that the workpiece is responsive to contact forces during insertion, and realignment with the insertion axis is passively accommodated.

It is also known to employ a RCC device having translational and rotational compliance utilizing only a single stage of compliance elements. For example, U.S. Pat. No. 4,414,750 discloses such a single stage RCC device comprising a pair of spaced monolithic members connected by three axially compressible and laterally deformable elements which provide both rotational and translational compliance about a remote center of compliance external to the RCC device. While these types of devices are simpler in construction than the two stage RCC devices, they often do not provide a sufficiently high degree of translational and rotational compliance while still being able to transmit torque. In addition, it is not possible to adjust the stiffness of the RCC device over a sufficient compliance range.

Accordingly, a need still exists for an RCC device having a single stage which is still capable of a high degree of translational and rotational compliance, is capable of easily transmitting torque and in which a range of compliance is achieved by being able to adjust the stiffness of the RCC device.

SUMMARY OF THE INVENTION

It is an object of the present invention to provide a single stage RCC device having a high degree of translational and rotational compliance.

It is another object of the present invention to provide an RCC device which is easily capable of transmitting torque.

It is still another object of the present invention to provide an RCC device in which the compliance may be adjustable to provide a wide range of compliance control.

It is a further object of the present invention to provide an RCC device which is capable of a wide variety of applications requiring a significant range of strength and precision.

To achieve the foregoing and other objects of the present invention, and in accordance with the purpose of the invention, there is provided a single stage remote center compliance device having a high degree of translational and rotational compliance for use in connection with a manipulator device, comprising a first member adapted to be connected to a manipulator device and a second member spaced from the first member. Means are provided for interconnecting the first member with the second member for both rotational and translational compliance about a remote center of compliance external to the compliance device. The interconnecting means include a pair of crossed, interconnected shafts, one of the shafts being connected to the first member and the other of the shafts being connected to the second member. The interconnecting means further include a plurality of axially compressible and laterally deformable elements such as compression coil springs connected between the first and second members. Means in the form of adjustable set screws are provided for adjusting the stiffness of each of the springs. In a preferred embodiment, the first and second members have a common axis extending therethrough and at least four separate compression coil springs are spaced about the axis between the two members and are tilted inwardly at an angle between the first and second members.

In one embodiment of the device the crossed shafts are rigidly connected to each other and are slidably and rotatably connected to the first and second members. In another embodiment of the device, one of the shafts is rigidly connected to one of the members and the other of the shafts is slidably and rotatably connected to the one shaft and the other of the members.

These, together with other objects and advantages, which subsequently will be apparent, reside in the details of construction and operation of the invention as more fully hereinafter described and claimed, reference being made to the accompanying drawings forming a part hereof wherein like numerals refer to like parts throughout.

BRIEF DESCRIPTION OF THE DRAWINGS

FIG. 1 is a front, elevational view showing an RCC device of the present invention mounted at the end of an actuator arm and carrying a pin laterally offset from the center of a mating hole in a workpiece;

FIG. 2 is a front, elevational view of an RCC device of the present invention mounted on the end of an actuator arm and carrying a pin whose axis is not parallel with the axis of a mating hole;

DETAILED DESCRIPTION OF THE PREFERRED EMBODIMENT

Figure 3:
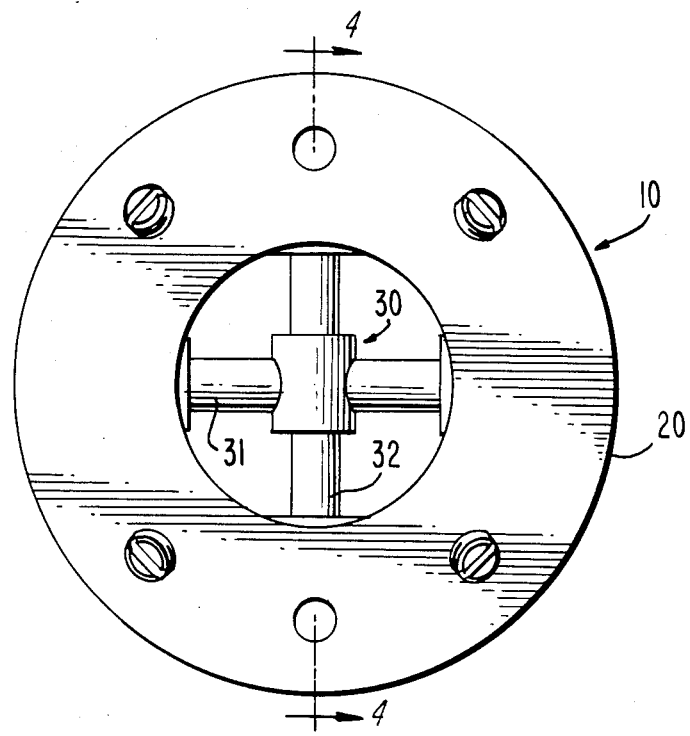
FIG. 3 is an enlarged, top plan view of the RCC device of the present invention.

Referring to the drawings, shown in FIGS. 1 and 2 is a remote center compliance (RCC) device, generally indicated by the numeral 10, attached at its top to a manipulator or actuator device such as robot arm 12. Attached to the bottom of the RCC device is an operator member such as pin 14. While for illustrative purposes reference is made to pin 14, the operator means could also be a tool, a gripper device or the like. As shown in FIGS. 1 and 2, the pin 14 is in the process of being aligned and manipulated into a mating hole 16 formed in a workpiece 18. In FIG. 1, the pin 14 is laterally offset from the center of the mating hole 16 whereby the pin 14 would have to be laterally displaced to the right of the figure in order to precisely mate with the hole 16. In FIG. 2, the pin 14 is shown rotated to the left out of alignment with the center of the hole 16 whereby an intermediate portion of the pin 14 engages the left side of the hole 16 and the right end portion of the pin 14 engages the right wall of the hole 16. In order to properly insert the pin 14 in the hole 16, it would be necessary to rotate the pin 14 to the right to align the axis of the pin with the axis of the hole. The RCC device 10 of the present invention is capable of making these adjustments.

Figure 4:
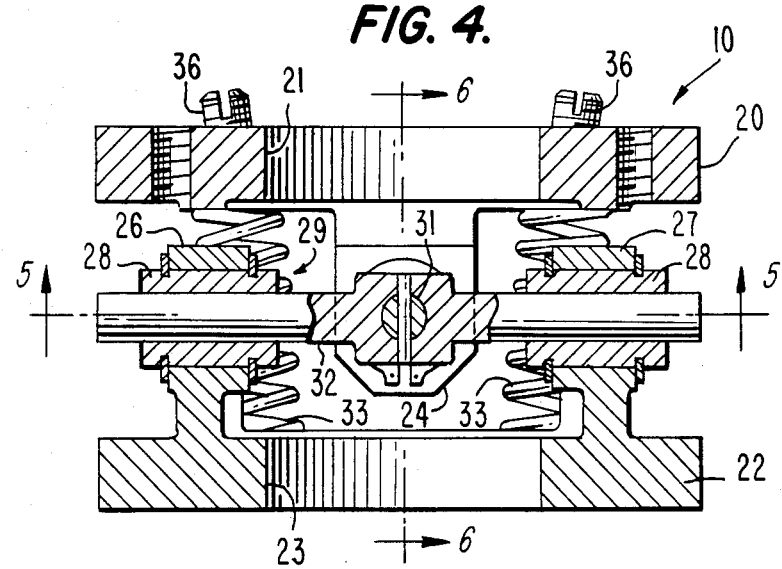
FIG. 4 is a cross-sectional view taken along line 4—4 of FIG. 3.

Referrring to FIGS. 3-7, the RCC device 10 of the present invention includes a first member 20 having a central opening 21 therein and a separate spaced second member 22 having a central opening 23 therein. In the normal position of the RCC device, as shown in FIG. 4, the first and second members 20, 22 are aligned along a common axis extending therethrough. Both the first and second members 20, 22 may be in the form of annular metal plates. First member 20 is adapted to be connected to a manipulator device such as robot arm 12 whereas second member 22 is adapted to have an operator piece such as pin 14 connected thereto.

A pair of spaced yokes 24, 25 are mounted directly opposite each other adjacent the periphery of first member 20 and extend inwardly from the inner surface thereof. A similar pair of yokes 26, 27 are mounted opposite each other adjacent the periphery of second member 22 and extend inwardly from the inner surface thereof. Mounted in each of the yokes is a set of linear ball bearings 28.

Interconnecting means, generally indicated by the numeral 29, are provided for slidably and rotatably connecting the first and second members 20 and 22. The interconnecting means 29 include a spider, generally indicated by the numeral 30, comprised of a pair of crossed, rigidly interconnected shafts 31 and 32. The four ends of the shafts 31 and 32 of spider 30 are each rotatably and slidably mounted in one of the bearings 28 mounted in the yokes 24, 25, 26, 27. The spider 30 provides sufficient strength to the RCC device 10 to effectively transmit torque to the operator member 14 while still maintaining a high degree of translational and rotational compliance.

Figure 5:
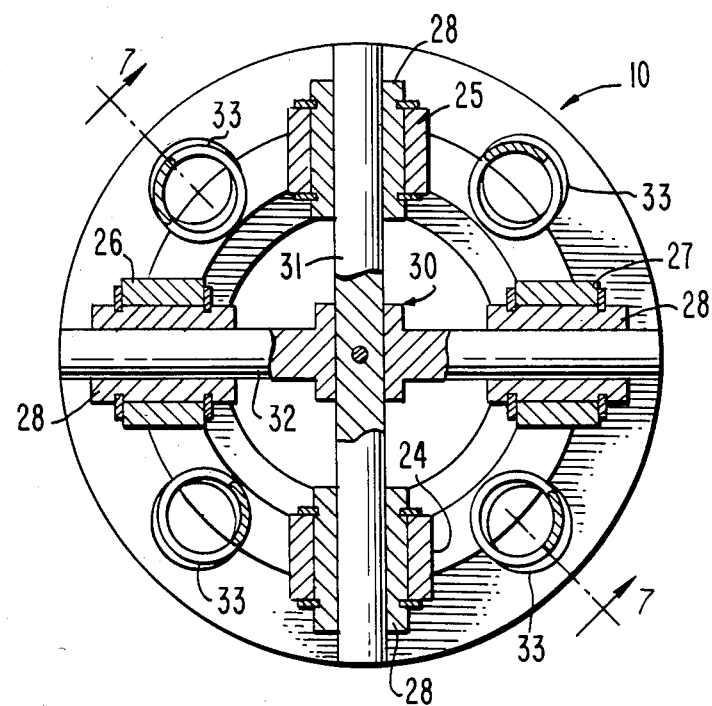
FIG. 5 is a cross-sectional view taken along line 5—5 of FIG. 4.
Figure 6:
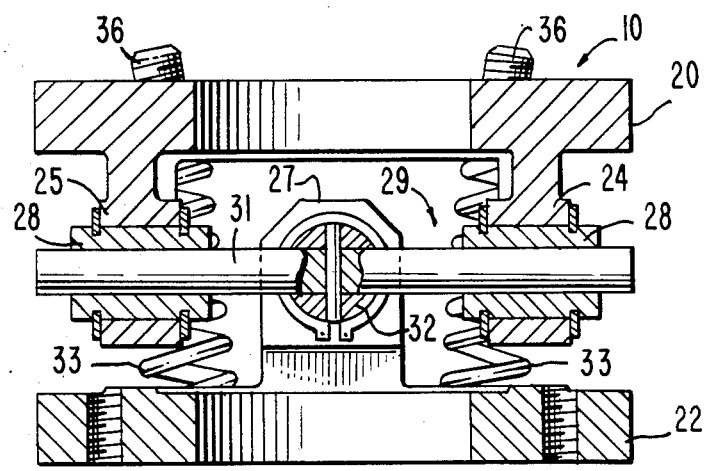
FIG. 6 is a cross-sectional view taken along line 6—6 of FIG. 4.

Also forming part of the means interconnecting the first member 20 with the second member 22 are four tilted, axially compressible and laterally deformable elements such as compression coil springs 33, equally spaced about the common axis extending through the first and second members and positioned adjacent the periphery of the members. As best shown in FIG. 5, each spring is positioned at the midpoint between two adjacent yoke members. The springs 33 provide self-centering and stabilization of the mechanism.

Figure 7:
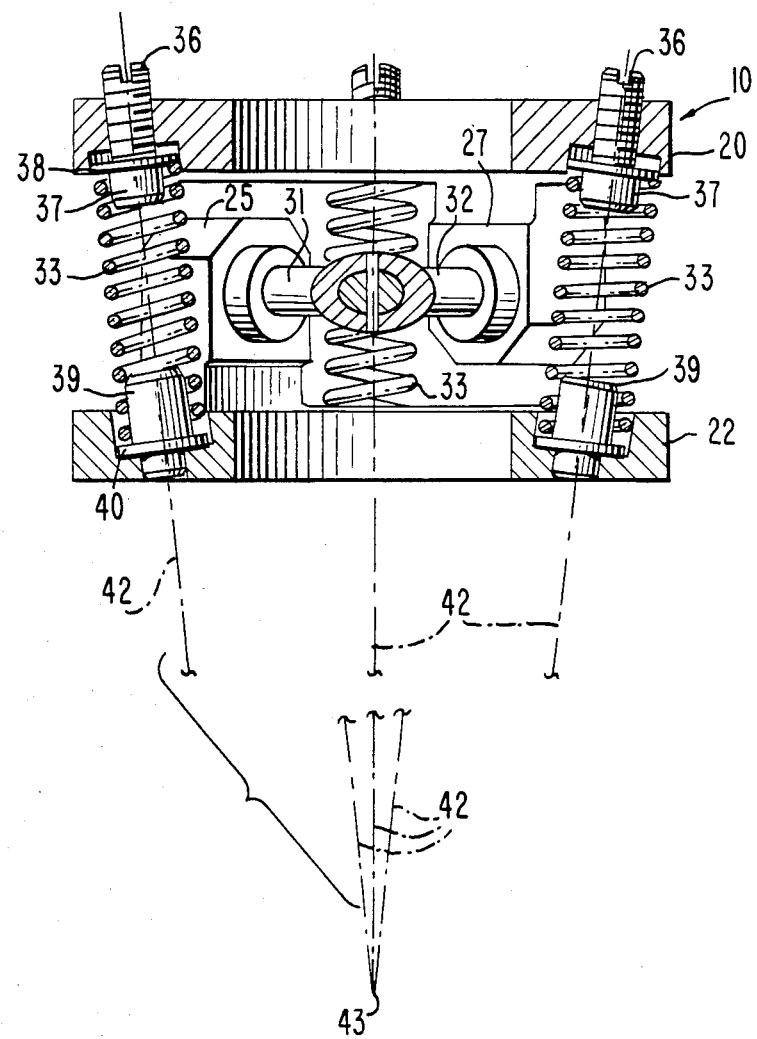
FIG. 7 is a cross-sectional view taken along line 7—7 of FIG. 5.

As most clearly shown in FIG. 7 each spring 33 is connected to first member 20 by a threaded, adjustable screw 36 which extends from the outside of the member 10 through the member and ends in a pin extension 37 which fits inside of the spring 33. A flange 38 is provided on the screw 36 to engage the end of the spring 33. As is apparent, the set screw 36, pin extension 37 and flange 38 are all one piece. Each spring 33 is connected at its other end to second member 22 by a pin 39 having a flange 40 thereon which engages the end of the spring. The pins 39 act as stabilizer pins and function to return the parts of the RCC device to their normal center position. In the embodiment shown in FIG. 7, pin 39 is fixedly secured to second member 22 by any suitable means such as a shrink fit. Alternatively, pin 39 also may be an adjustable screw. By adjusting each screw 36, the stiffness of each of the springs 33 may be varied. Thus, a compliance range may be achieved because of the change of stiffness in the springs 33 of the RCC device 10. The range of compliance available by having the adjustable set screws is particularly useful for large manipulators where a wide range of pay loads is imposed. An additional advantage that results from being able to adjust the stiffness of the springs is that resonant conditions can be actively avoided, thus helping to reduce vibration problems.

Referring again to FIG. 7, the compression coil springs 33 each lie along conically disposed radii 42 which converge at a focus point or center 43. The RCC device also has a remote center of compliance which is defined as a point in space where lateral force causes only lateral deflection in the mechanism, and a torque force causes only rotation about the point. The remote center of compliance lies between the focus 43 and the RCC device 10 at or near the tip of the operator member or pin 14. Thus, as shown in FIGS. 1 and 2, the remote center of compliance is designated by the point 44 near the tip of the pin 14. Since the remote center 44 is known, its behavior under various axial and lateral error conditions is determinable. The specific benefits obtained through the ability to alter the remote center of compliance 44 are reflected by an increase to both the range of pay loads and positional accuracy which can be accommodated by the single stage RCC device 10. By altering the effective spring stiffness of each of the springs 33, the position of the remote center of compliance 44 may be altered.

Figure 9:
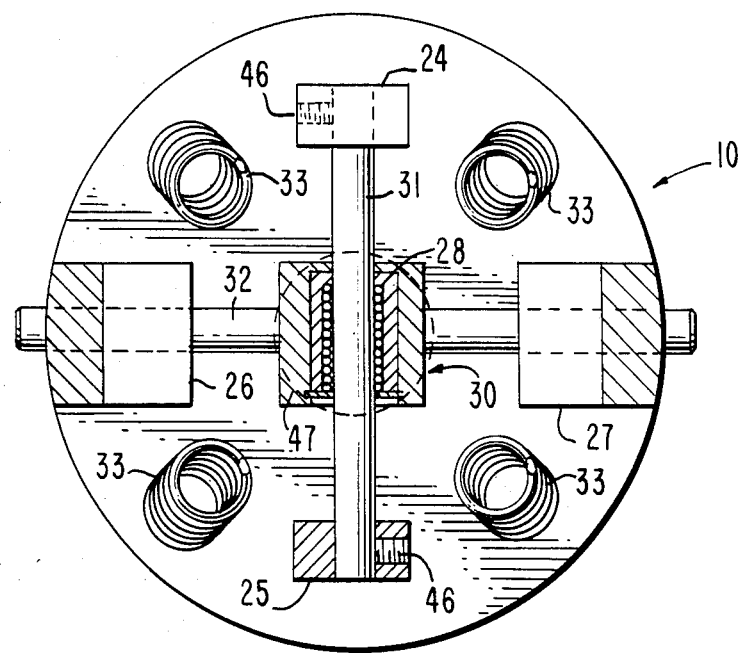
FIG. 9 is a top, plan view taken along line 9—9 of FIG. 8.
Figure 8:
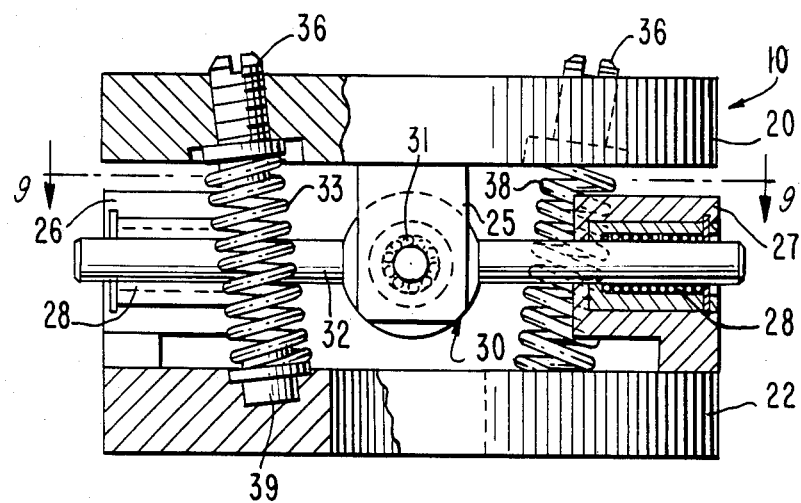
FIG. 8 is a partially cross-sectional, side elevational view of another embodiment of an RCC device of the present invention.

Another embodiment of the invention is shown in FIGS. 8 and 9. Since the parts of the RCC device shown in FIGS. 8 and 9 are the same except for the manner in which certain of the parts are connected, the parts will be designated by the same numerals used in connection with the embodiment shown in FIGS. 1-7.

Shown in FIGS. 8 and 9 is an RCC device 10, having a first member 20 and a second member 22 spaced therefrom and interconnected by four tilted, axially compressible and laterally deformable compression coil springs 33, equally spaced about the common axis extending through the first and second members and positioned adjacent the periphery of the members. The stiffness of each spring may be adjusted by use of the screws 36. The springs 33 are connected to second member 22 by pin 39.

Also forming part of the interconnecting means is a spider, generally indicated by the numeral 30, comprised of a pair of crossed interconnected shafts 31 and 32. Shaft 31, however, unlike the embodiment shown in FIGS. 1-7, is fixedly secured to yoke members 24 and 25 attached to first member 20. The shaft is fixedly attached to the yokes 24 and 25 by any suitable means such as set screws 46. Shaft 32 is rotatably and slidably mounted in yokes 26 and 27 attached to member 22 by means of sets of linear ball bearings 28. Shaft 32 further is slidably and rotatably connected to shaft 31 by means of another set of linear ball bearings 28 mounted in a bushing 47 mounted on shaft 31. Except for the difference noted above, the embodiment of FIGS. 8 and 9 is constructed in the same fashion as the embodiment of FIGS. 1-7 and essentially operates the same as the device of the embodiment shown in FIGS. 1-7.

It is apparent from the foregoing that many advantageous features are provided by the present invention over the prior art. A remote center compliance device is provided having a single stage but which still possesses a high degree translational and rotational compliance and which is capable of easily transmitting torque. Moreover, a range of compliance is easily achieved by adjusting the stiffness of the springs of the RCC device.

Numerous alterations and modifications of the structure herein disclosed will suggest themselves to those skilled in the art. It is to be understood, however, that the present disclosure relates to the preferred embodiments of the invention which are for purposes of illustration only and are not to be construed as a limitation of the invention. All such modifications which do not depart from the spirit of the invention are intended to be included within the scope of the appended claims.

We claim as our invention:

1. A remote center compliance device having a high degree of translational and rotational compliance for use in connection with a manipulator device comprising:
   a first member adapted to be connected to said manipulator device;
   a second member spaced from said first member; and
   means interconnecting said first member with said second member for providing both rotational and translational compliance about a remote center of compliance external to said compliance device;
   said interconnecting means including a pair of crossed, interconnected shafts, one of said shafts being connected to said first member and the other of said shafts being connected to said second member;
   said interconnecting means further including a plurality of axially compressible and laterally deformable elements connected between said first and second members.

2. The compliance device of claim 1 wherein said elements are compression coil springs.

3. The compliance device of claim 2 which includes means for adjusting the stiffness of each of said springs.

4. The compliance device of claim 3 wherein said adjusting means comprises an adjustable screw at one end of each of said springs mounted in one of said members and wherein said compliance device further includes a stabilizer pin at the other end of each of said springs mounted in the other of said members.

5. The compliance device of claim 3 wherein said first and second members have a common axis extending therethrough and which includes at least four separate compression coil springs spaced about said axis.

6. The compliance device of claim 1 wherein said shafts are rigidly connected to each other and are slidably and rotatably connected to said members.

7. The compliance device of claim 1 wherein one of said shafts is rigidly connected to one of said members and the other of said shafts is slidably and rotatably connected to said one shaft and the other of said members.

8. The compliance device of claim 1 wherein each of said members has a pair of spaced yokes extending out from a surface thereof for mounting one of said shafts.

9. A remote center compliance device having a high degree of translational and rotational compliance for use in connection with a manipulator device comprising:
   a first member adapted to be connected to said manipulator device;
   a second member spaced from said first member, said first and second members having a common axis extending therethrough;
   means interconnecting said first member with said second member for providing both rotational and translational compliance about a remote center of compliance external to said compliance device;
   said interconnecting means including a pair of spaced yokes extending out from a surface of each of said members and a pair of crossed, interconnected shafts, one of said shafts being mounted in one of said pair of yokes and the other of said shafts being mounted in the other of said pair of yokes;
   said interconnecting means further including at least four separate axially compressible and laterally deformable compression coil springs spaced about said axis and connected between said first and second members;
   means for adjusting the stiffness of each of said springs comprising an adjustable screw at one end of each of said springs mounted in one of said members; and
   a stabilizer pin at the other end of each of said springs mounted in the other of said members.

10. The compliance device of claim 9, wherein said shafts are rigidly connected to each other and are slidably and rotatable mounted in said yokes.

11. The compliance device of claim 9, wherein one of said shafts is rigidly connected to one pair of said yokes and the other of said shafts is slidably and rotatably connected to said one shaft and the other pair of said yokes.

* * * * *